Patented May 10, 1949

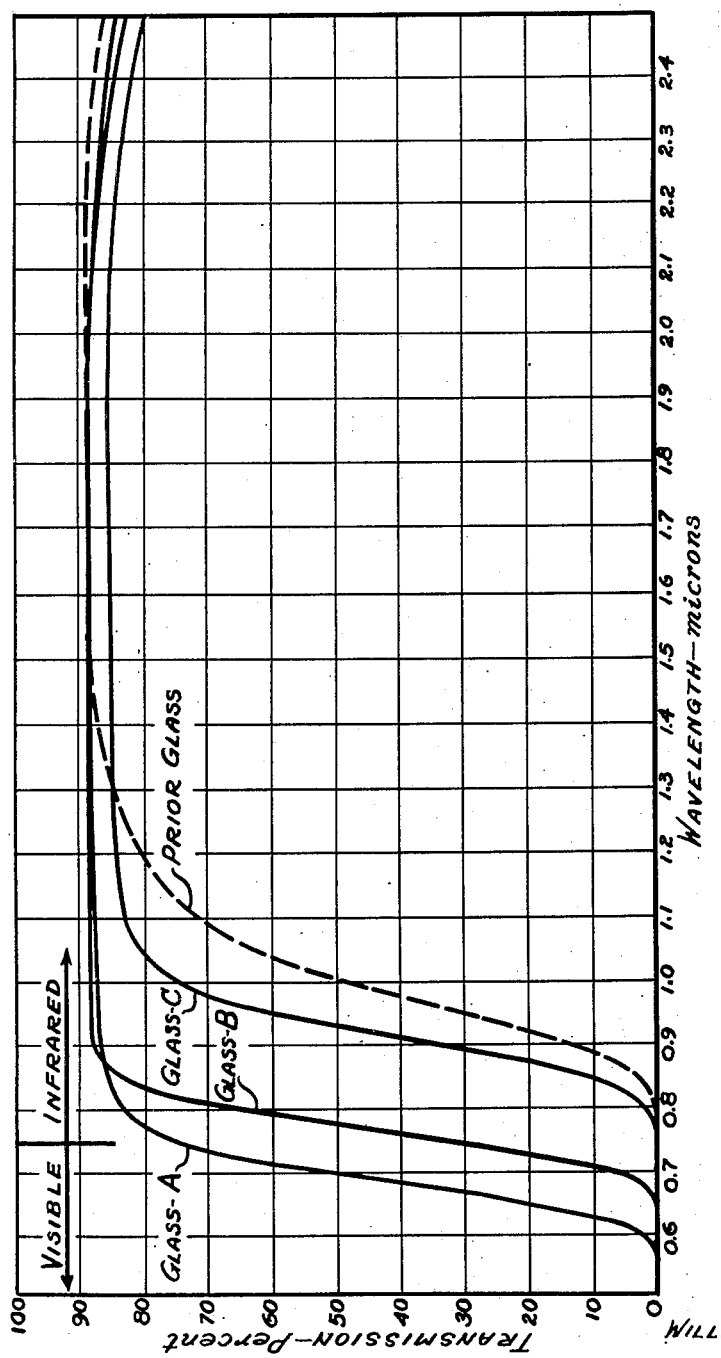

2,469,490

UNITED STATES PATENT OFFICE 2,469,490

INFRARED TRANSMITTING GLASS

William H. Armistead, Corning, N. Y., assignor to Corning Glass Works, Corning, N. Y., a corporation of New York Application November 6, 1944, Serial No. 562,224

2 Claims. (Cl. 106—52)

This invention relates to glass compositions and has for its primary object to provide a glass which is opaque to visible radiations but substantially transparent to infrared radiations.

Another object is to provide a glass having a sharper cutoff for the visible radiations than prior glasses of this type.

Another object is to provide a method for shifting and controlling the cutoff of such glasses.

Another object is to provide infrared transmitting glasses in which the position of the cutoff varies through the visible red, or, in other words, glasses which also transmit varying amounts of the visible red.

Another object is to provide cheap batches for glasses having high transmissions for long wave length visible red and infrared radiations.

To these and other ends I have discovered that antimony selenide, when incorporated into reduced glasses, will produce black infrared transmitting glasses, that is, glasses which completely absorb the visible radiations shorter than about .75 micron while transmitting infrared radiations. Particularly good results are obtained with glasses comprising silica, alkali metal oxide and an oxide of a metal of the group consisting of magnesium, calcium, strontium and barium. I have also found that the cutoff for visible radiations in the new glasses is substantially sharper than the cutoff in prior infrared transmitting glasses. I have further found that the addition of sulfur to form antimony sulfide in such glasses causes a shift in the cutoff whereby some of the visible red radiations also are transmitted without weakening the sharpness of the cutoff.

The unique spectral characteristics of the new glasses are due to the selenide of antimony or the mixed selenide and sulfide of antimony which are sufficiently insoluble in glass to form a colloidal coloration. Barium-containing glasses produce the best result. Glasses containing zinc or cadmium or lead do not produce the desired result. Boric oxide, in glasses containing alkaline earth oxides, increases the solubility of the coloring materials in the glass and tends to deprive the glass of its color. Alumina, on the other hand, decreases the solubility of the coloring materials in such glasses and tends to cause precipitation and opacity. Consequently, boric oxide and alumina are useful for controlling the intensity of the coloration obtained. Iron oxide in amounts as large as .05% $Fe_2O_3$ appreciably impairs the transmission of the new glasses and this impurity should therefore be kept to a very low concentration.

The color and spectral properties of the new glasses depend upon strong reduction of the glass during melting, preferably by the use of carbonaceous reducing agents such as lamp black. This ensures the maximum reduction of selenium and sulfur compounds to form the coloring selenide and sulfide of antimony and minimizes the formation in the glass of polyselenides and polysulfides which would cause discoloration. I have found that from .5% to 1.5% of carbon or its equivalent is sufficient for my purpose. The carbon is eliminated from the glass during melting but leaves the glass in a reduced condition, that is, with a minimum content of polysulfides and polyselenides.

The selenide and sulfide of antimony are produced in the glass, preferably by the introduction into the batch of antimony oxide and selenium and sulfur or a compound of sulfur such as sodium sulfate. When the batch is melted the selenide and sulfide of antimony are formed. For best results, about 1.5% to 3% $Sb_2O_3$ and about 1% or more of selenium or their equivalents are required. The following batches are examples of compositions which are illustrative of the scope of my invention:

Table I

|  | A | B | C | D | E | F | G |
|---|---|---|---|---|---|---|---|
| Sand | 375 | 375 | 375 | 325 | 325 | 370 | 350 |
| $BaCO_3$ | 64 | 64 | 64 | 160 | 160 | | |
| $CaCO_3$ | | | | | | 72 | |
| $Na_2CO_3$ | 128 | 128 | 128 | 43 | 43 | 154 | 171 |
| $H_3BO_3$ | | | | 26 | 26 | | 71 |
| $Al(OH)_3$ | | | | 15 | 15 | | 15 |
| $Na_2SiF_6$ | 5 | 5 | 5 | 5 | 5 | 5 | |
| $Sb_2O_3$ | 15 | 12.5 | 10 | 10 | 10 | 10 | 10 |
| Selenium | 5 | 5 | 5 | 15 | 5 | 10 | 5 |
| Sulfur | 5 | 2.5 | | | | | |
| Carbon | 5 | 5 | 5 | 5 | 5 | 5 | 5 |

The small amount of sodium silicofluoride which is shown in some of the batches serves to fine the glass during melting but has no substantial effect on the transmission of the final glass. The above batches, when melted, are equivalent to the following compositions as calculated therefrom in percent by weight.

Table II

|  | A | B | C | D | E | F | G |
|---|---|---|---|---|---|---|---|
| $SiO_2$ | 70.7 | 71.4 | 72.2 | 61.3 | 62.5 | 70.5 | 68.0 |
| BaO | 9.4 | 9.5 | 9.6 | 23.6 | 24.0 | | |
| CaO | | | | | | 7.6 | |
| $Na_2O$ | 14.2 | 14.3 | 14.4 | 4.7 | 4.8 | 17.1 | 19.4 |
| $B_2O_3$ | | | | 2.8 | 2.9 | | 7.8 |
| $Al_2O_3$ | | | | 1.9 | 1.9 | | 1.9 |
| $Na_2SiF_6$ | .9 | .9 | .9 | 1.0 | 1.0 | 1.0 | |
| $Sb_2O_3$ | 2.9 | 2.5 | 1.9 | 1.9 | 1.9 | 1.9 | 1.9 |
| Se | .9 | .9 | .9 | 2.8 | 1.0 | 1.9 | 1.0 |
| S | .9 | .5 | | | | | |
| Visible Color | red | dark red | black | black | black | black | black |

All of the above glasses have a relatively high transmission for infrared radiations. Glasses C to G inclusive contain no sulfur and are substantially opaque to visible radiations in 3 mm.

thickness. Glasses A and B, on the other hand, contain sulfur and transmit various amounts of the visible radiations.

In order to illustrate the unique spectral properties of the new glasses, reference is had to the accompanying drawing in which are shown solid line curves representing the percentage transmission of glasses A, B and C in a thickness of 3 mm. at various wave lengths from .6 micron to 2.5 microns. For comparison with the new glasses a dashed line curve is shown which represents the transmission of a prior infrared transmitting glass in 3 mm. thickness which is colored with manganese and chromium.

It will be noted that glass C, which contains no sulfur, has a zero transmission at .75 micron, but that glass B, which contains approximately half as much sulfur as selenium, transmits about 40%, and glass A, which contains equal percentages of sulfur and selenium, transmits nearly 80% at .75 micron. Thus by the introduction of small amounts of sulfur it is possible to produce glasses having a very dark red color which are useful for specific purposes such as filters for optical pyrometers and the like.

It will further be noted that the cutoff of the new glasses is substantially sharper than that of the prior glass or, in other words, that their transmissions in the neighborhood of the visible fall off more rapidly than those of the prior glasses. This has the advantage that a glass, such as glass C, can be produced which has a zero transmission at .75 micron and at the same time has a higher transmission at .9 micron than prior glasses. Such a glass is particularly useful in connection with apparatus, such as burglar alarms, signalling devices and the like, which embody a photoelectric cell, such as the so-called caesium cell, having a maximum sensitivity for radiations in the neighborhood of .9 micron. A decrease in the color saturation of the prior glass, that is, a decrease in its content of coloring agent so as to increase its transmission at .9 micron, would disproportionately increase its transmission for shorter wave lengths and would result in a substantial transmission at .75 micron.

The term "reduced silicate glass" as used in the claims means a glass prepared by fusion of raw glass-making materials under reducing conditions, containing on the oxide basis, a major proportion of silica and a minor proportion of an alkali metal oxide such as sodium oxide, preferably containing a minor proportion of an oxide of an alkaline earth metal such as magnesium, calcium, strontium, or barium, and optionally containing a minor proportion of boric oxide or alumina, but being free of compounds of zinc, cadmium, and lead.

I claim:

1. An infrared-transmitting glass opaque to wave lengths shorter than about .6 micron and transparent to wave lengths longer than about 1 micron in a 3 mm. thickness, consisting essentially of a reduced silicate glass containing colloidally dispersed antimony selenide, the antimony computed as $Sb_2O_3$ being from about 1.5% to 3% and the selenium computed as Se being from about 1% to 3% on an oxide basis as calculated from the batch.

2. An infrared-transmitting glass opaque to wave lengths shorter than about .6 micron and transparent to wave lengths longer than about 1 micron in a 3 mm. thickness, consisting essentially of a reduced silicate glass containing colloidally dispersed antimony selenide and antimony sulfide, the antimony computed as $Sb_2O_3$ being from about 1.5% to 3%, the selenium computed as Se being from about 1% to 3%, and the sulfur computed as S being from about .5% to 1% on an oxide basis as calculated from the batch.

WILLIAM H. ARMISTEAD.

REFERENCES CITED

The following references are of record in the file of this patent:

UNITED STATES PATENTS

| Number | Name | Date |
|---|---|---|
| 1,271,652 | Bellamy | July 9, 1918 |
| 1,983,151 | Silverman | Dec. 4, 1934 |
| 2,049,765 | Fischer | Aug. 4, 1936 |
| 2,097,275 | Fischer | Oct. 26, 1937 |
| 2,099,602 | Fischer | Nov. 16, 1937 |

FOREIGN PATENTS

| Number | Country | Date |
|---|---|---|
| 44,536 | France | 1934 |
| 421,142 | Great Britain | 1934 |
| 776,979 | France | 1934 |
| 181,758 | Switzerland | 1936 |
| 445,344 | Great Britain | 1936 |
| 640,153 | Germany | 1936 |
| 668,593 | Germany | 1938 |

OTHER REFERENCES

Ceramic Industry, Colored Glass Marbles Widely Used in Industry, page 52 (Sept. 1940).